United States Patent [19]

Robertsen et al.

[11] 4,348,660
[45] Sep. 7, 1982

[54] AUTOMATICALLY RELEGENDABLE KEYBOARD

[75] Inventors: Anthony L. Robertsen, Mission Viejo; Andrew M. McInnis, Los Alamitos, both of Calif.

[73] Assignee: Sheldon Industries Inc., Monrovia, Calif.

[21] Appl. No.: 185,542

[22] Filed: Sep. 9, 1980

[51] Int. Cl.³ .................................................. G06C 7/02
[52] U.S. Cl. ............................ 340/365 VL; 340/365 R
[58] Field of Search ........ 340/365 VL, 365 R, 365 S, 340/709; 40/378, 386, 471

[56] References Cited

U.S. PATENT DOCUMENTS

| | | | |
|---|---|---|---|
| 3,200,375 | 8/1965 | Lutz | 340/365 VL |
| 3,717,870 | 2/1973 | Mathews et al. | 340/365 VL |
| 3,760,360 | 9/1973 | Reynolds et al. | 340/365 VL |
| 4,017,848 | 4/1977 | Tannas, Jr. | 340/365 R |
| 4,257,179 | 3/1981 | Oka et al. | 340/365 VL |
| 4,274,081 | 6/1981 | Nomura et al. | 340/365 VL |

Primary Examiner—Gerald L. Brigance
Attorney, Agent, or Firm—William W. Haefliger

[57] ABSTRACT

An automatically relegendable keyboard apparatus includes:
- (a) an endwise elongated belt having keyboard legends thereon,
- (b) a driver engaging the belt to drive the belt endwise and present a selected portion of the keyboard belt in a planar viewing zone, and
- (c) a transparent key panel at the front side of said belt portion presented at said viewing zone, with associated means to provide an electrical output corresponding to the location of a selected area of the panel to which the user's finger is applied, there being multiple of said selected areas of the key panel corresponding to legends on said selected portion of the belt which are viewable through the transparent key panel.

21 Claims, 12 Drawing Figures

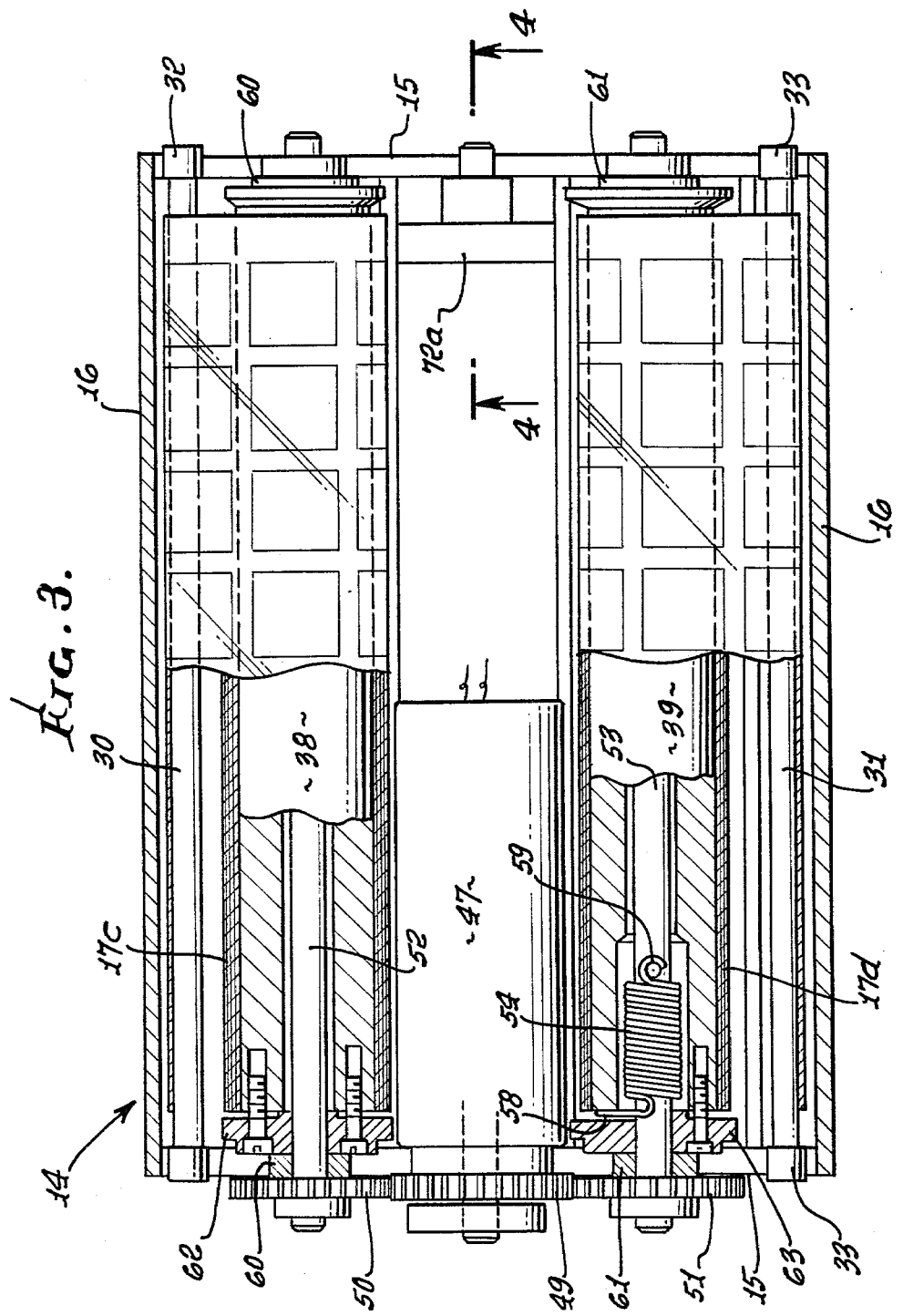

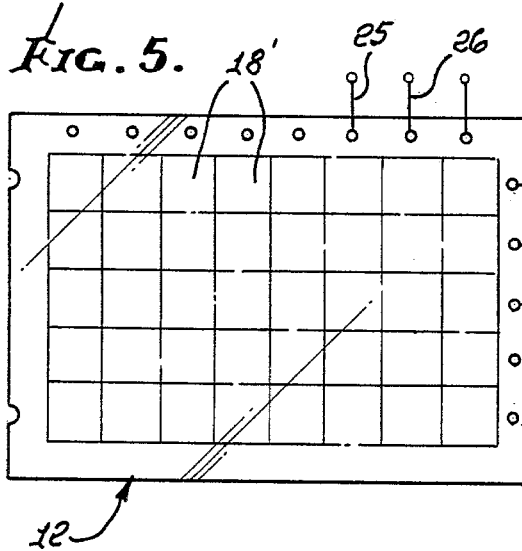
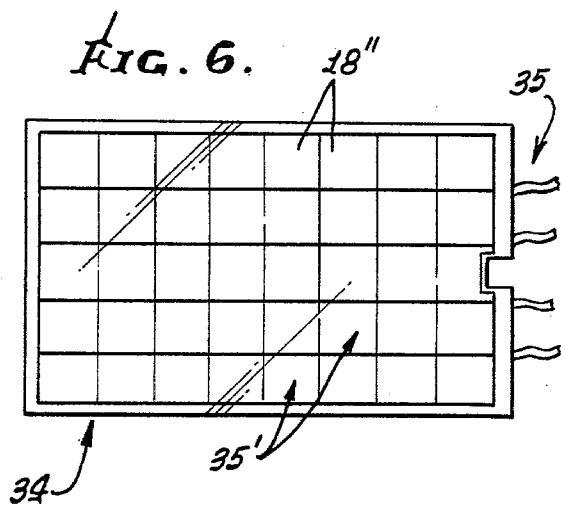
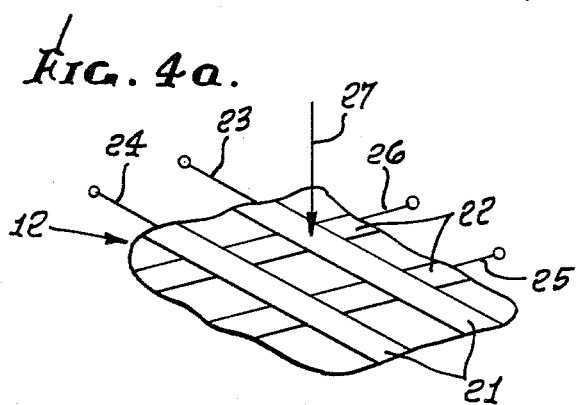
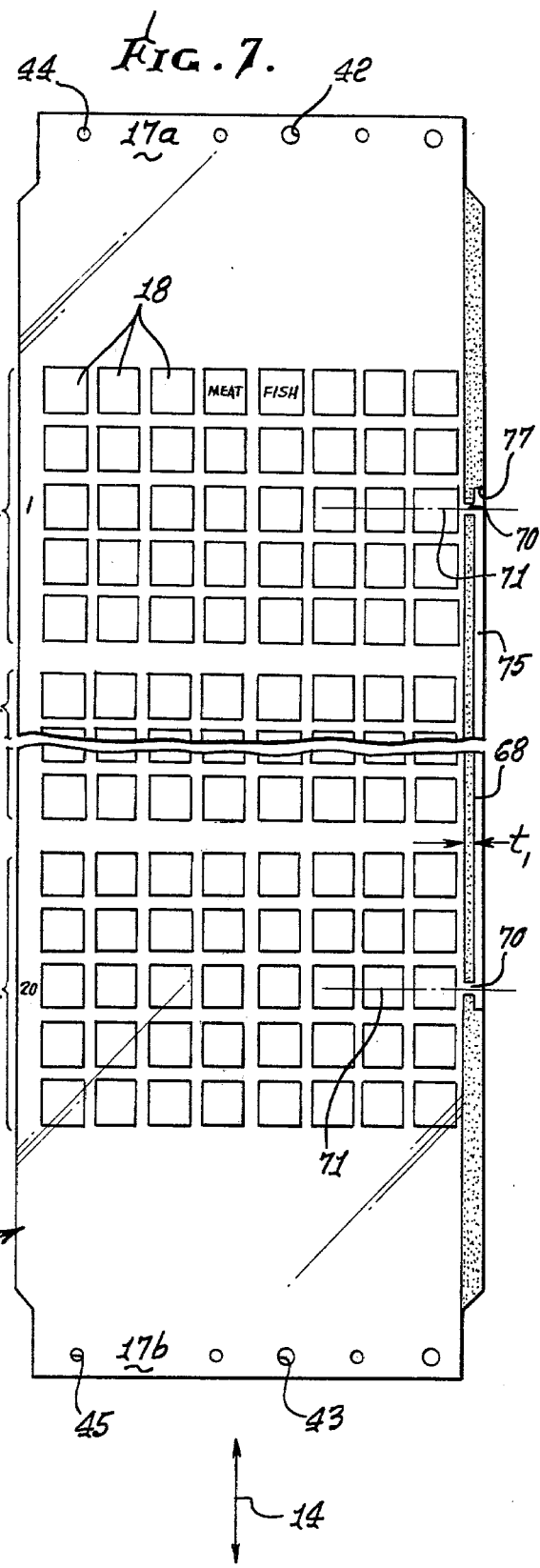

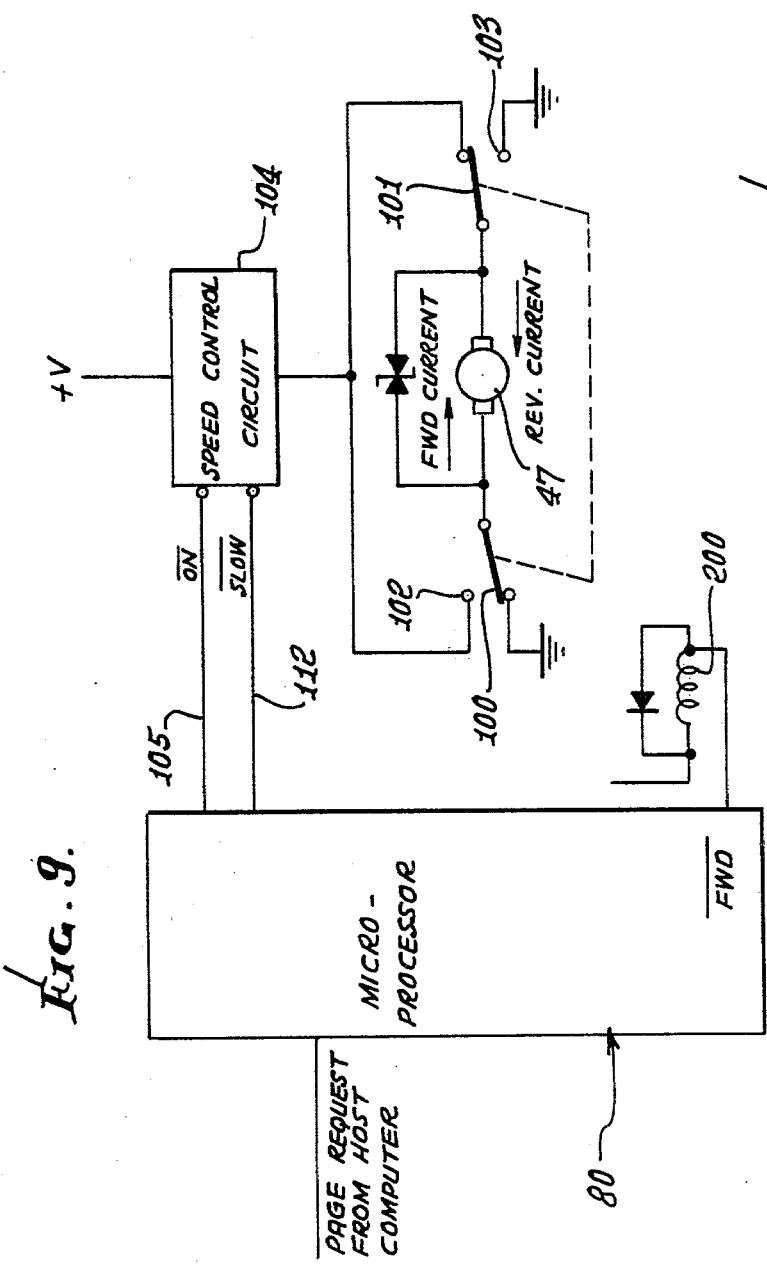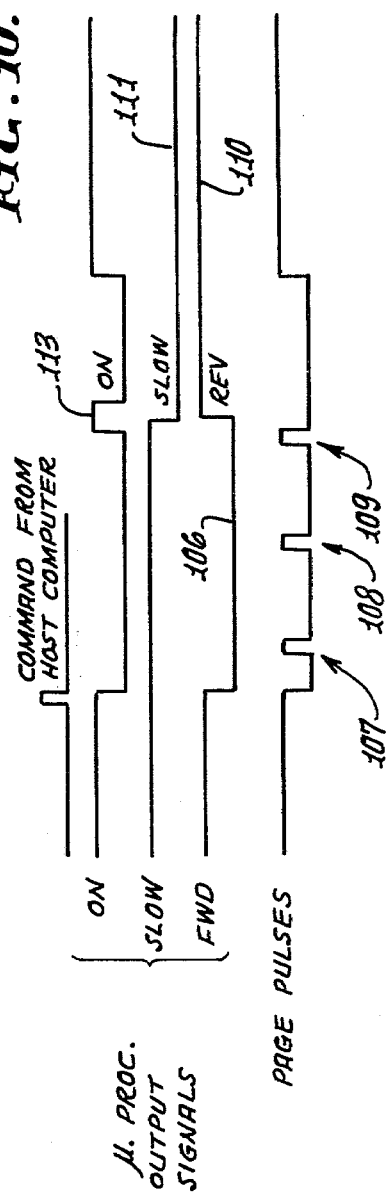

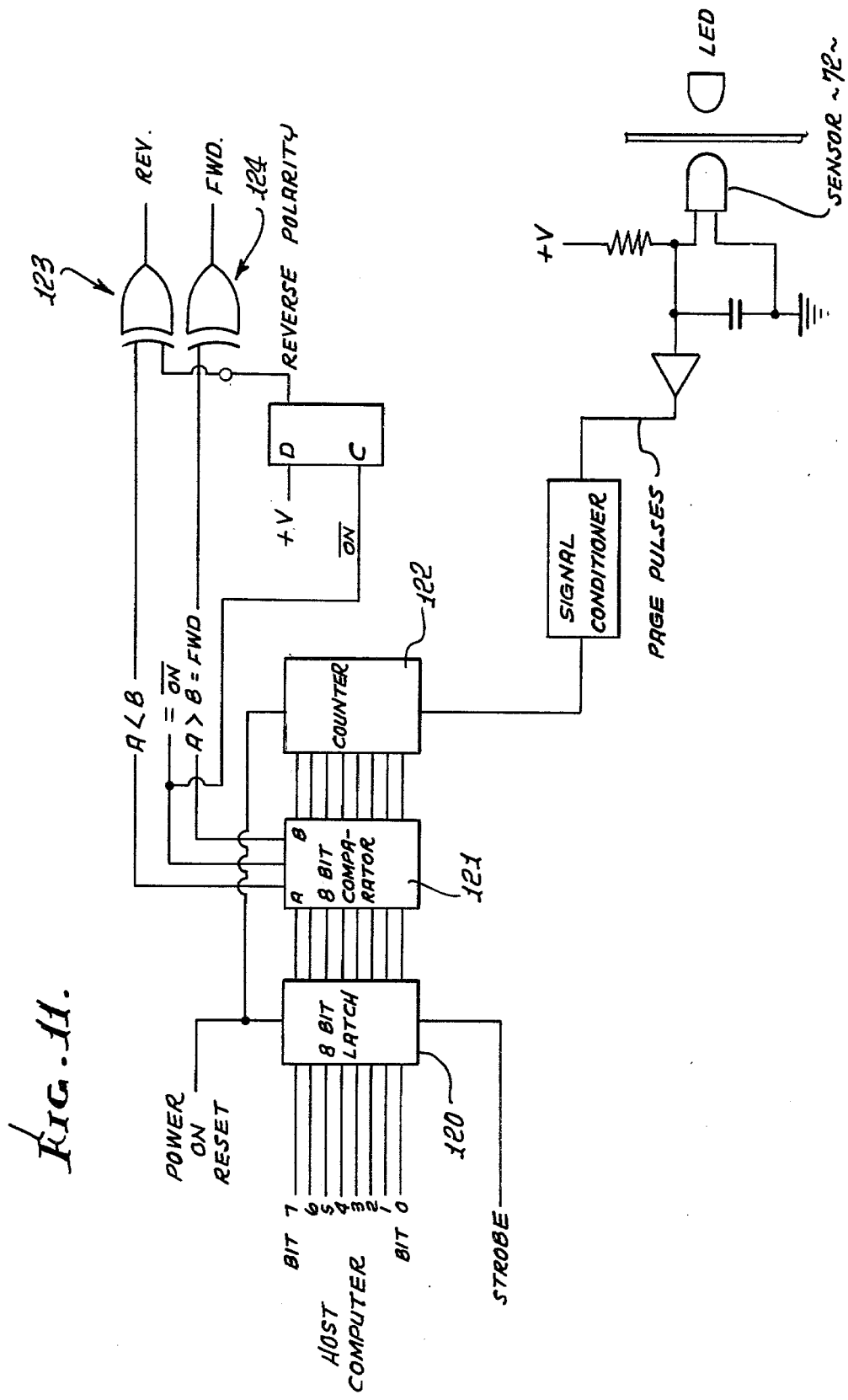

AUTOMATICALLY RELEGENDABLE KEYBOARD

BACKGROUND OF THE INVENTION

This invention relates generally to keyboard apparatus employing variable key legends; and more particularly concerns a device employing different "pages" or "fields" of key legends, such "pages" being selectable and usable in conjunction with a fixed key panel having a limited number of key areas.

In conventional keyboard equipment the number of keyboard configurations that may be employed by the user is quite limited, each configuration defining a fixed set of keys. While any key may be used for as many different functions as correspond to the labels on the key, it becomes difficult to provide more than a very few such labels on any one key. To appreciably increase the number of functions that may be performed or initiated by a key, it is desirable to achieve key identity or association with many labels, and in selected relation.

SUMMARY OF THE INVENTION

It is a major object of the invention to meet the above need through the use of apparatus employing a traveling belt or like media having keyboard legends therein, together with a transparent key panel at the front side of the belt portion presented at a viewing zone.

As will appear, the belt or media has multiple "pages" of legends thereon, each page typically including rows and columns of legend areas or squares which are brought into registration with corresponding keyboard areas or squares on the fixed key panel, and beneath same, so that the belt is not exposed to the exterior. Accordingly, the belt remains protectively confined beneath the key panel, and may be located to travel between two glass sheets, also located beneath the key panel.

Further, control means may be provided to control the energization of the drive means in response to sensing of endwise travel of selected length portions of the belt into registration with the viewing zone. Such control means typically includes a scannable band on the belt with interruptions in the band corresponding to locations of selected belt portions or "pages" of legends; and a sensor is provided to scan the band and control motor energization to drive the belt so as to bring that interruption into the field of view of the sensor, in belt stopped condition. A second scannable band with a "homing" scannable interruption may also be provided.

Finally, microprocessor circuitry is provided for control connection to the keyboard, illumination panel or means, sensors and motor circuitry, as will appear. That processor may be connected to a remote computer and to auxiliary devices such as printers, displays and cash drawers.

These and other objects and advantages of the invention, as well as the details of an illustrative embodiment, will be more fully understood from the following description and drawings, in which:

DRAWING DESCRIPTION

FIG. 3 is an elevation taken in section on lines 3—3 of FIG. 2;

FIG. 4a is a perspective view of a bus arrangement;

FIG. 5 is a frontal elevation showing a key panel as incorporated in the device of FIGS. 1-4;

FIG. 6 is an electroluminescent panel as employed in the device of FIGS. 1-4;

FIG. 7 is a plan view of a keyboard belt as employed in the device of FIGS. 1-4;

FIGS. 9-11 are circuit diagram.

DETAILED DESCRIPTION

Figure 1:
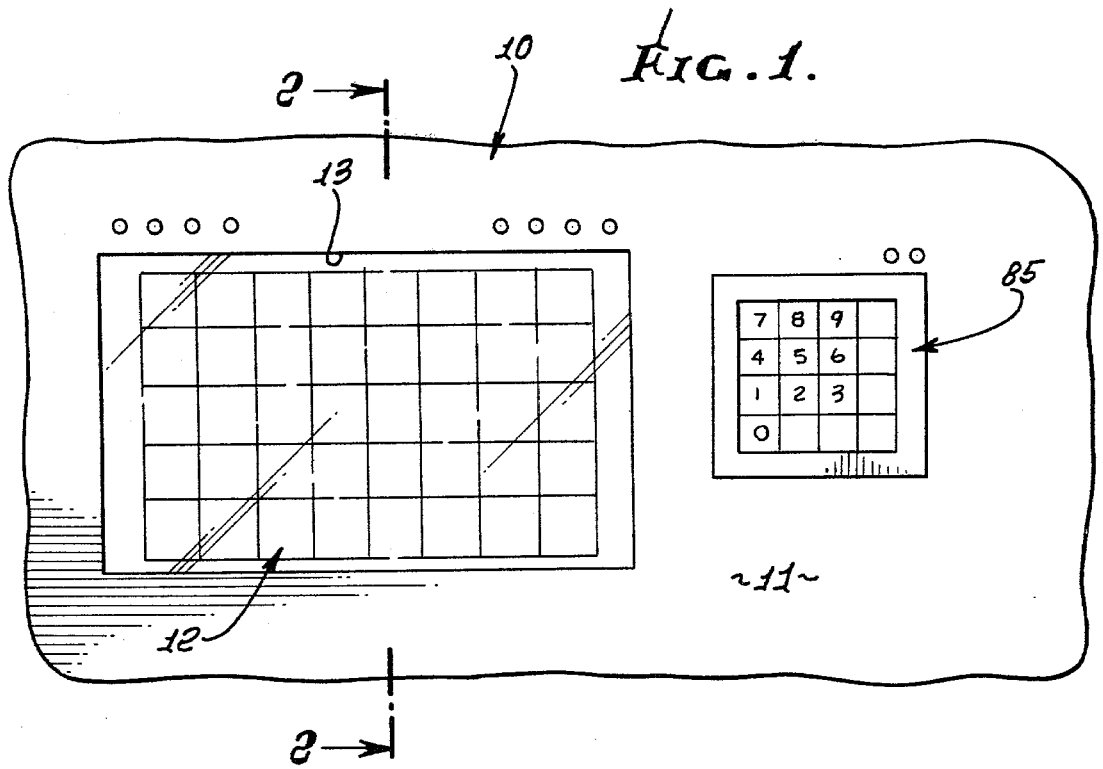
FIG. 1 is a front elevation showing the console face of apparatus incorporating the invention.
Figure 2:
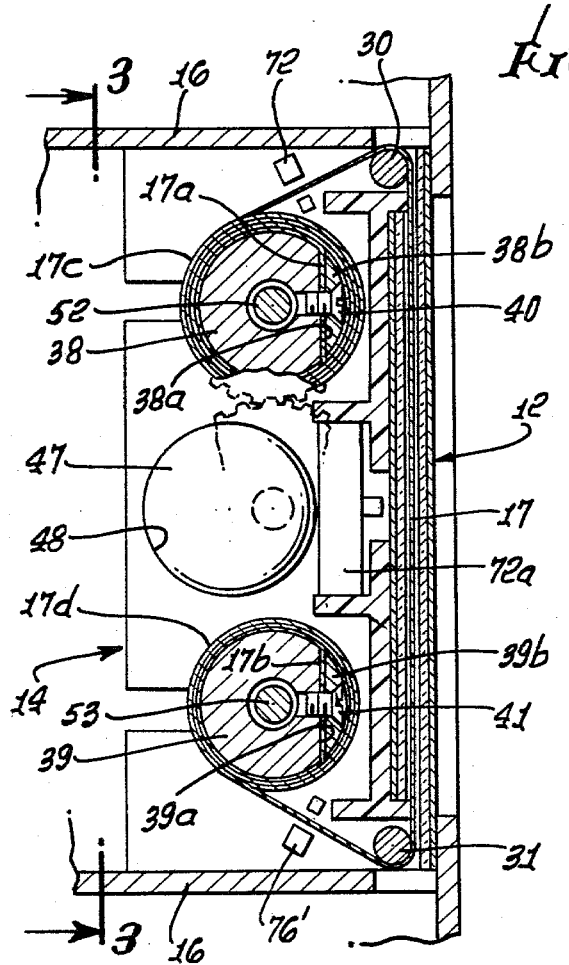
FIG. 2 is an enlarged vertical section on lines 2—2 of FIG. 1.

Referring first to FIG. 1, apparatus 10 embodying the invention may include a front panel 11 viewed by the user. A transparent key panel 12 is seen through an opening 13 in the front panel 11. Located behind the latter and attached thereto is a body or frame 14, which includes end members 15 and side members 16, as seen in FIGS. 2 and 3.

An endwise elongated belt 17 is provided to have keyboard legends thereon, as represented by the square or rectangular areas 18 seen in FIG. 7. These areas are typically formed in rows and columns to define multiple "pages", as for example the 1-20 pages seen in FIG. 7. Each page as shown includes eight columns and five rows of legend areas 18, these being illustrative only (i.e. other numbers of rows and columns may be employed). The belt is typically transparent (except for the legend squares and legends thereon—see the "meat" and "fish" legends on two squares, for example), and may for example consist of MYLAR film, a few thousandths inch in thickness.

Drive means is provided to engage the belt and drive it endwise, i.e. in the direction of arrows 14 in FIG. 7, so as to present a selected portion of the belt in a planar viewing zone at the rear side of the key panel. Such a viewing zone may be that as depicted at 20 in FIG. 4. In this regard, it will be seen from FIGS. 1 and 5 that the key panel or "keyboard" 12 has a number of square "keys" 18' arranged in rows and columns corresponding to legend squares 18 of one "page" on the belt. Therefore, when the belt has been advanced endwise to position a selected "page" in zone 20 in proper registration with the "keys" 18', the user may view the legends on squares 18 through the transparent "keys" 18', which register with squares 18.

The key panel 12 has associated therewith means to provide an electrical output corresponding to the location of a selected area or square 18' of that panel, whereby when a user applies his finger to that square, a unique signal will be produced. As an example of this, FIG. 4a shows the panel 12 to include longitudinally spaced, laterally extending busses 21, and laterally spaced, longitudinally extending busses 22 spaced closely below busses 21, all such busses being transparent. The busses conduct electrical current supplied as via associated leads as at 23-26. When the user presses down on a square 18' corresponding to the arrow 27 in FIG. 4a, the associated busses 21 and 22 are brought into interengagement, shorting leads 23 and 25 (for example), whereby the particular intersection, i.e. square 18' associated with the underlying legend on square 18 on the selected "page", is uniquely identified. Since the particular selected page is known by virtue of its location in zone 20, and has a uniquely identifying signal associated therewith, it becomes possible to provide a very large number of key signals using only a limited number of keys. Panels 12 are commercially available from sources such as Sierracin Corp., Sylmar, Calif.

Figure 4:
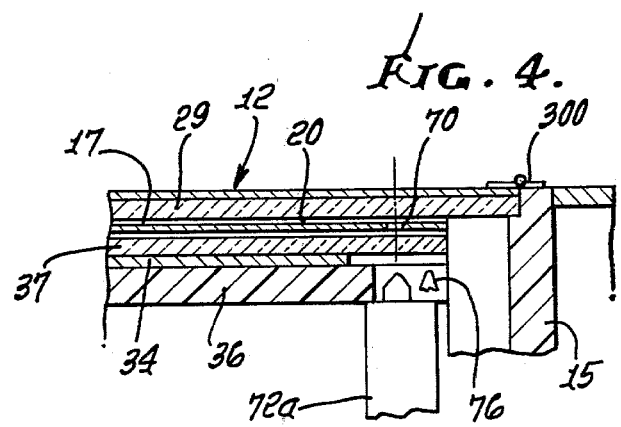
FIG. 4 is an enlarged section on lines 4—4 of FIG. 3.

Referring to FIGS. 2–4, it will be understood that the belt 17 is driven endwise in planar viewing zone 20, as for example over and between idler shafts or rolls 30 and 31. The latter are suitably journaled for rotation in members 15, at locations 32 and 33. It is of advantage to employ a protective transparent panel, such as glass sheet 29 sandwiched between the key panel 12 and belt 17, with running clearance between the belt and panel 29. Accordingly, the glass sheet protects the plastic key panel 12 against abrasion from the moving belt, and also affords a back-up or support for the key panel, whereby finger pressure may effect the shorting of selected busses 21 and 22 as discussed above regarding FIG. 4a.

Also provided is means to illuminate selected portions of the belt, i.e. a selected "page", or selected legend areas (or group of same) on a page. One such means is shown at 34 in FIGS. 4 and 6 as comprising an electroluminescent panel extending at the rear side of the selected belt portion. Such panels may be obtained for example from General Electric Company, Schenectady, N.Y., and from Lumnescent Systems Inc., Lebanon, N.H. FIG. 6 shows the panel as having electrical connections 35 respectively associated with different illuminable portions of the panel, as for example rows 35', or squares 18" that correspond to and are in registration with squares or areas 18" of key panel 12. Panel 34 is suitably supported by frame plate 36, and a protective transparent panel such as glass sheet 37 is located or sandwiched between panel 34 and belt 17. Running clearance is provided between sheet 37 and the belt, as shown in FIG. 4. Other illuminating means includes a plasma panel, a product of Mitsubishi Corp., Japan.

The above referenced bolt drive means may with unusual advantage include a pair of rollers 38 and 39 about which opposite ends of the belt are wrapped for retention, together with motor means to rotate the rollers to drive the belt endwise through zone 20. In the example, the opposite ends 17a and 17b of the belt are retained to the respective roller flats 38a and 39a as by sections 38b and 39b of the rolls. These sections are in turn held in place by screws 40 and 41 passing through the sections and belt ends. See screw holes 42 and 43 in FIG. 7, as well as other holes 44 and 45 to pass retainers. The wraps of the belt about the rollers appear at 17c and 17d in FIGS. 2 and 3.

Typically, the drive means includes a single electrical motor 47 rotatably coupled to the rollers, the motor carried by a frame wall 15 as at 48. The drive means also includes a drive spur gear 49 coupled to and driven by the motor, and a pair of driven spur gears 50 and 51 meshing with the drive gear and respectively coupled to the rollers, as by shafts 52 and 53. The latter are connected to the gears and extend coaxially within the rollers, as shown. Shaft 52 is directly coupled to the roller 38, whereas a tensioning spring 54 couples shaft 53 to roller 39. Spring 53 acts to transmit drive or torque between gear 51 and roller 39 and also acts to transmit torque that serves to tension the belt, due to spring tension; also the spring serves to compensate for the variable differential rotating speed of the two rollers due to the belt wrap-up on the rollers—i.e. as the belt unwraps off one roller, that roller tends to increase its speed of rotation, and vice versa. The number of wrappings of the spring about shaft 53 is sufficiently great that belt tension is maintained as the belt crosses zone 20, while roller variable speed is also maintained (i.e. the spring windings about shaft 53 increase or decrease, while the number of spring windings remaining remains sufficient for belt tension exertion). Connections of the coil spring ends to the roller and shaft appear at 58 and 59.

The shafts 52 and 53 are suitably journaled to walls 15 as at 60 and 61. Retainers 62 and 63 are employed on the ends of the rollers, as shown.

Control means is also provided to control the energization of the drive motor in response to sensing of endwise travel of selected length portions of the belt into registration with zone 20, or key panel 12, whereby any desired "page" of the belt may be positioned in registration with the key panel 12.

In the example, and referring to FIG. 7, it will be noted that a narrow "page" band 68; of width "$t_1$" extends longitudinally at the side of the belt. The darkened band is interrupted at locations 70, one for each "page", and positioned on a lateral line 71 that bisects the associated page. A "page" sensor 72 (see FIG. 2) is located to optically sense the presence of an interruption 70, so as to produce a signal to command deenergization of the motor, stopping driving of the belt. In this regard, where the sensor is located as in FIG. 2 between roller 38 and idler 30, it actually senses the presence of an interruption other than the one associated with the page in the viewing zone; however, since a counter is employed to count the interruptions as they pass the sensor, the circuitry senses a particular interruption associated witth page "n" when page "n+1" is in the viewing zone, it being at that time desired to located page "n+1" in the zone. FIG. 4 shows a sensor 72a located at the side of the viewing zone, and sensing a gap or interruption 70.

Normally, deenergization of the motor occurs during some overtravel of the belt relative to viewing position. To compensate for this, the motor is automatically re-energized to rotate in the reverse direction at a relatively slower speed, bringing the interruption 70 back into the field of view of the sensor 72, at which time the motor is again deenergized with the selected page in precise registration with the keyboard 12. A second longitudinally extending band 75 adjacent band 68 is scanned by a second ("home") sensor (as for example an optical sensor 76 in FIG. 4). Band 75 is shown as transparent in FIG. 7. When the sensor 76 detects the end of that band, as repressented by the edge 77 of darkened area 78, the sensor produces a signal that deenergizes the drive motor. The drive of the motor is then reversed, so that the belt will travel in the opposite direction for page scanning purposes. Sensor 76 may be located between roller 39 and idler 31, as indicated at 76' in FIG. 2.

Figure 8:
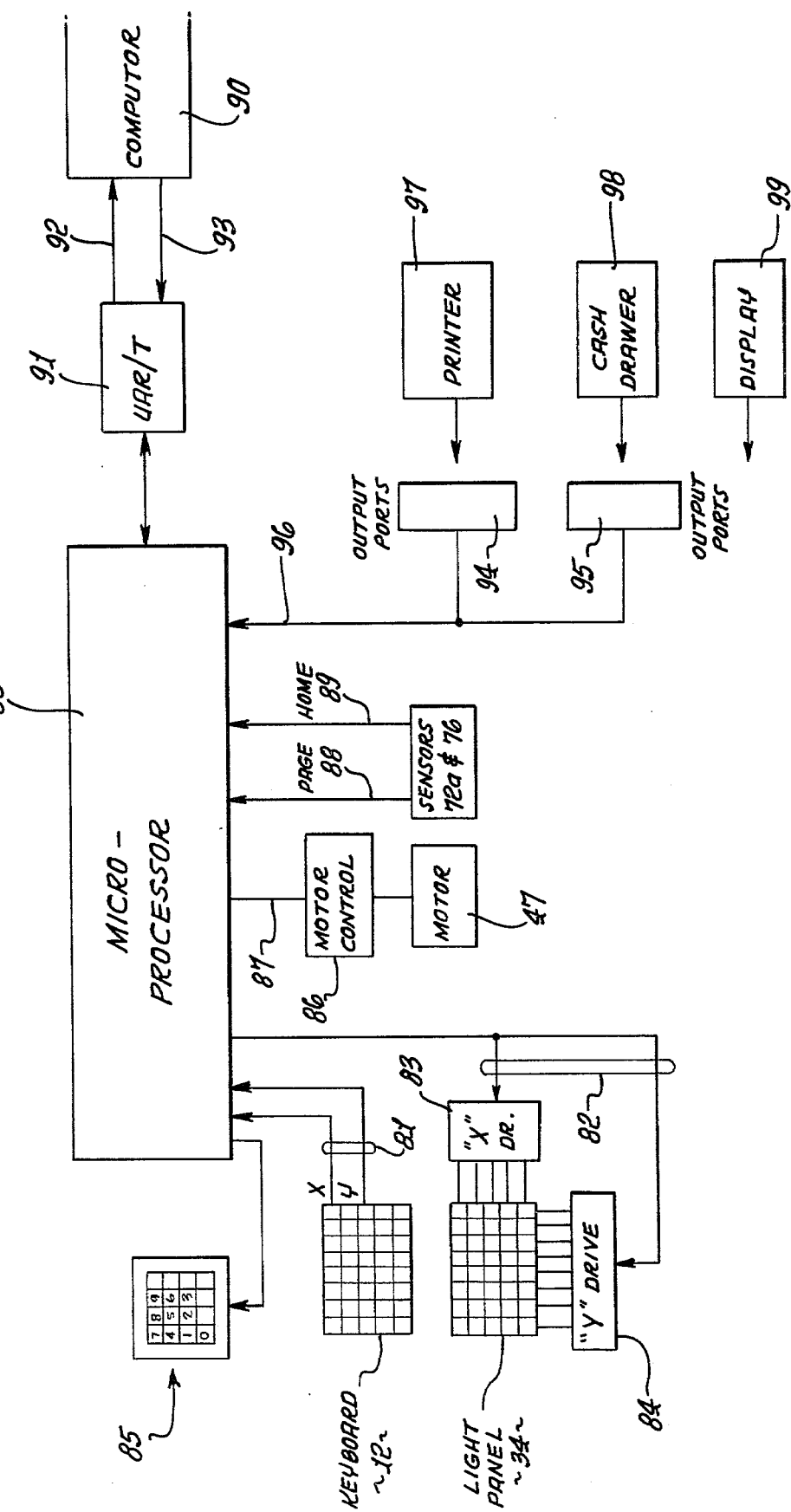
FIG. 8 is a block diagram of a control means including a belt drive control.

FIG. 8 illustrates in block diagram from a usable control circuit. A conventional microprocessor 80 is coupled at 81 to the keyboard 12 and at 82 to the light panel 34, as via X and Y drives 83 and 84. Thus, illumination of the entire panel 34, or rows or columns thereof, or individual squares thereof, may be controlled, as desired. An optional keyboard 85 is also connected to the microprocessor, and is also seen in FIG. 1, and may for example be used to select the "page" number (on the belt) to be presented in the viewing zone. Alphanumeric keyboard 85 may be like board 12, and it may be located on each page of the belt if desired.

Motor 47 is connected to the processor via motor control 86 (ON-OFF, etc.) and lines 87; and the "page"

and "home" sensors 72a and 76 are connected with the processor via lines 88 and 89.

Finally, the processor may be connected with a computer 90 through UAR/T unit 91 (conventional serial interface), as via full duplex channels 92 and 93; and output ports 94 and 95 are shown connected at 96 with the processor to enable coupling of the latter to auxiliary equipment such as printer 97, cash drawer 98 (of a cash register) and display 99. An extremely large number of data commands may be processed using the different and selectable keyboard legends on the different "pages" of belt 20.

FIGS. 9 and 10 illustrate in more detail the control of motor operation. FIG. 9 shows the motor 47 connected in series between relay wipers 100 and 101, connected as shown. When the relay coil 200 is energized by the processor 80, wiper 100 is displaced to engage normally open contact 102, and wiper 101 displaced to engage normally open contact 103 which is grounded. This allows forward current passage from the control circuit 104 through the motor, assuming the circuit 104 is "ON", as commanded by the microprocessor, so that the motor drives the belt, fast forward via line 105. (An $\overline{ON}$ command going logically to high state via the line produces an OFF condition, with the motor not operating). See in this regard line segment 106 in FIG. 10, representing fast forward operation. Page pulses 107 and 108 are generated by the sensor 72 and are counted by a counter in the processor. When the count reaches a selected number of "pages", i.e. pulse 109 is produced, the relay coil 200 is de-energized by the processor. This allows the wipers to return to the positions illustrated, for reverse operation of the motor (see line segment 110 in FIG. 10 in this regard). Current then passes via wiper 101 reversely through the motor, and via wiper 100 to ground. At the same time the current is reduced, for slow speed drive of the motor. See line segment 111 in FIG. 10. The processor signals the circuit 104 via line 112 (command $\overline{SLOW}$) to provide reduced current to the motor, for this purpose. Prior to that command, supply of current to the motor is briefly cut-off (see short line segment 113 in FIG. 10, corresponding to an $\overline{ON}$ (i.e. OFF) command.

When the edge of the band interruption corresponding to the selected page is sensed as the belt is slowly reversely driven, the processor signals circuit 104 via line 105 with an $\overline{ON}$ (i.e. OFF) command, shutting the motor off, in preparation for reverse drive. A typical processor is identified as Motorola 6805.

FIG. 11 shows comparator, latch and counter circuitry usable to detect the arrival of a selected "page" at viewing position. The microprocessor may be programmed to emulate these functions. When the "counted" number of pages (as sensed by the sensor 72) is less than or greater than the binary count in the latch 120 (as selected by the host computer), the output of the comparator 121 (connected to the latch and the counter 122) commands the motor to drive the belt (forward or reverse depending upon belt direction of travel), as indicated by the REV or FWD gates 123 and 124 connected by logic circuitry to the motor. When the counts in 120 and 122 are equal, the command to the motor is $\overline{ON}$ (i.e. turn off).

Referring back to FIG. 4, the panels 12 and 29 may be hinge connected at 300 to the frame or housing 15, thereby facilitating direct access to the belt for changing labels on the belt, or adding (writing) in the label squares or spaces.

The described apparatus may have various sizes, and is virtually unlimited as to the number and variety of key legends provided on the belt, which may have great length.

I claim:

1. In automatically relegendable keyboard apparatus, the combination comprising
    (a) an endwise elongated belt having keyboard legends thereon,
    (d) drive means engaging the belt to drive the belt endwise and present a selected portion of the keyboard belt in a planar viewing zone, and
    (c) a transparent key panel at the front side of said belt portion presented at said viewing zone, with associated means to provide an electrical output corresponding to the location of a selected area of the panel to which the user's finger is applied, there being multiple of said selected areas of the key panel corresponding to legends on said selected portion of the belt which are viewable through the transparent key panel,
    (d) the key panel overlying the belt, and there being a rigid protective transparent panel sandwiched between said selected portion of the belt and said key panel so that the rigid panel and the key panel both overlie the belt, the rigid panel blocking motion transmission from the key panel to the belt.

2. The apparatus of claim 1 wherein said protective transparent panel comprises a glass sheet.

3. The apparatus of claim 1 including means for illuminating said selected portion of the belt.

4. The apparatus of claim 3 wherein said means for illuminating said selected portion of the belt comprises an electroluminescent panel extending at the rear side of said belt portion.

5. The apparatus of claim 4 including a protective transparent panel sandwiched between said electroluminescent panel and said selected portion of the belt.

6. The apparatus of claim 5 wherein said protective transparent panel comprises a glass sheet.

7. The apparatus of claim 1 wherein said drive means includes a pair of rollers about which opposite ends of the belt are wrapped, and motor means to rotate said rollers to drive the belt endwise.

8. The apparatus of claim 7 wherein said drive means includes a single motor rotatably coupled to both of said rollers.

9. The apparatus of claim 8 wherein said drive means includes a drive gear coupled to and driven by said single motor, and a pair of driven gears meshing with said drive gear and respectively coupled to said rollers.

10. The apparatus of claim 9 wherein said drive means includes a drive shaft connected to one of said driven gears, and a tensioning spring coupled between said drive shaft and one of said rollers, said spring acting to transmit drive from said one driven gear to said one roller, and also acting to exert torque acting through said one roller to tension said belt.

11. The combination of claim 1 wherein the key panel has rows and columns of electrical conductors which are normally spaced apart at cross-over locations, said locations corresponding to said selected areas of the key panel to which the user's finger is applicable, each conductor in the row or column closest to the user's finger being deflectible to contact a selected conductor therebeneath.

12. The apparatus of claim 1 including control means to control the energization of said drive means in response to sensing of endwise travel of selected length portions of the belt into registration with said zone.

13. The apparatus of claim 12 wherein said control means includes a first scannable band on the belt and extending endwise longitudinally thereon, there being interruptions in said band spaced therealong in correspondence to locations of said selected portions of the belt.

14. The apparatus of claim 13 wherein said control means also includes a first sensor positioned to scan said band and to sense a selected interruption as it travels past the field of view of the sensor, and circuitry responsive to the output of said sensor to effect reverse drive of said motor so as to effect reverse drive of the belt until the interruption again comes into the field of view of the sensor, and then to effect stoppage of belt travel.

15. The apparatus of claim 14 wherein said control means includes a second scannable band on the belt and extending endwise longitudinally thereof, there being a homing interruption in said second band spaced to be detected when the belt has reached the end of desired longitudinal travel.

16. The apparatus of claim 15 wherein said control means also includes a second sensor positioned to scan the second band and to sense said homing interruption therein as it travels past the field of view of the second sensor, and circuitrry responsive to the output of the second sensor to effect operation of the motor to reverse the direction of belt travel.

17. The apparatus of claim 13 wherein said control means includes a microprocessor connected with:

($x_1$) said claim 1 sub-paragraph (c) associated means,
($x_2$) said sensor, and
($x_3$) said drive means.

18. The apparatus of claim 17 including belt illuminating means connected with said microprocessor.

19. The apparatus of claim 1 including structure supporting said (a), (b) and (c) elements, said structure connected to said key and rigid panels allowing their simultaneous displacement away from said selected portion of the belt at said viewing zone, to enable direct access to the belt for label alteration on the belt.

20. The combination of claim 1 wherein said legends are arranged in groups on and spaced along the belt to represent pages.

21. The combination of claim 20 wherein at least one page of legends includes an alphanumeric keyboard representation.

* * * * *